United States Patent [19]

Keaveney

[11] Patent Number: 4,895,888
[45] Date of Patent: Jan. 23, 1990

[54] LAMINATING INK COMPOSITION CONTAINING POLYAMIDE RESINS

[75] Inventor: William P. Keaveney, Pompton Plains, N.J.

[73] Assignee: BASF Corporation, Clifton, N.J.

[21] Appl. No.: 268,923

[22] Filed: Nov. 9, 1988

[51] Int. Cl.⁴ .................................................. C08K 5/05
[52] U.S. Cl. ....................................... 524/391; 524/379; 524/606
[58] Field of Search ................ 524/391, 379, 606; 528/310, 327, 335

[56] References Cited

U.S. PATENT DOCUMENTS

| | | | |
|---|---|---|---|
| 4,385,166 | 5/1983 | Carlick et al. | 524/606 |
| 4,547,562 | 10/1985 | Nichols | 528/310 |
| 4,820,765 | 4/1989 | Whyzmuzis | 528/335 |

*Primary Examiner*—Lewis T. Jacobs
*Attorney, Agent, or Firm*—Michael R. Chipaloski

[57] ABSTRACT

An improved fluid printing ink composition suitable for use in laminating inks is provided which comprises a resin, alcohol solvent, and a pigment. In accordance with the present invention the improvement is provided wherein the resin comprises an alcohol soluble polyamide resin having recurring units of the formula:

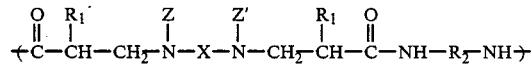

wherein $R_1$ is either hydrogen or methyl, $R_2$ is either a carbocyclic, aralkyl or linear or branched aliphatic group, X is an alkylene group, and Z and Z' each represent an alkyl group which may be the same or different or taken together to represent an alkylene group. The fluid ink compositions of the invention have superior qualities when used as laminating inks, are less expensive than previous laminating inks, and can be used successfully on a wide variety of packaging films.

10 Claims, No Drawings

LAMINATING INK COMPOSITION CONTAINING POLYAMIDE RESINS

FIELD OF THE INVENTION

The invention relates to a fluid ink composition particularly useful as a laminating ink which incorporates a polyamide resin, and a method for its preparation.

BACKGROUND OF THE INVENTION

In the printing and graphic arts, efforts are constantly made to develop new and improved inks for printing on a variety of surfaces. In particular demand are those fluid inks which can be printed or laminated on various packaging materials, such as polypropylene, polyester, and nylon films. These inks must also possess a number of qualities in order to be employed commercially, such as good adhesion to the films and high lamination bond strengths. It is thus highly desirable to develop inexpensive ink formulations with the characteristics necessary for use as a laminating ink.

The primary ingredients of fluid ink compositions are pigment, resin vehicle, and solvent. In attempts to develop superior fluid ink compositions, efforts have been directed at developing an improved resin vehicle which will impart the characteristics necessary for an ink to be used successfully in film lamination. During these attempts to develop new fluid ink resins, amido-amine compositions known to be useful as epoxy curing agents, as disclosed in U.S. Pat. No. 3,417,140 (McWhorter et al), were investigated. These amido-amine compositions were prepared by reacting a mixture of a fatty amine and polyamine with an unsaturated carbonylic compound through a Michael addition, followed by the condensation of an amine group with the carbonylic group. However, in tests producing these compounds in accordance with the teaching of the McWhorter et al patent, it was found that the products thus obtained were either of undesirably low molecular weight or were crosslinked. In either case, these compositions are unsuitable as laminating ink resins. It was desired, therefore, to find other resins which could be used successfully in fluid printing inks, and which would be particularly suitable for use in laminating fluid inks.

SUMMARY OF THE INVENTION

An improved fluid printing ink composition suitable for use in laminating inks is provided which comprises a resin, alcohol solvent, and a pigment. In accordance with the present invention, the improvement is provided wherein the resin comprises an alcohol soluble polyamide resin having recurring units of the formula:

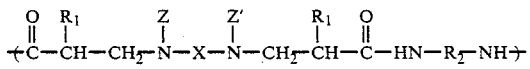

wherein $R_1$ is either hydrogen or methyl, $R_2$ is either a carbocyclic, aralkyl, or linear or branched aliphatic group, X is an alkylene group, and Z and Z' each represent an alkyl group which may be the same or different or taken together to represent an alkylene group. The fluid inks thus formed have excellent qualities as laminating ink formulations.

DETAILED DESCRIPTION OF PREFERRED EMBODIMENTS

The polyamide resins useful in the fluid ink compositions of the present invention may be prepared via the method disclosed in Ogata et al., *Polymer Journal* 5:186–194 (1973), which is essentially a two-stage procedure having the following steps:

(a) a bis(secondary amine) is reacted with an acrylic ester to form an intermediate diester; and (b) the intermediate diester is condensed with a bis(primary amine) in order to form the polyamide resin product.

In the first step of the preparation, a bis(secondary amine) is employed so that the intermediate diester formed does not contain active hydrogen. The bis(secondary amines) useful in the invention are represented by the formula

wherein X represents an alkylene group, Z and Z' each represent an alkyl group which may be the same or different or Z and Z' taken together represent an alkylene group. As a result of the use of the bis(secondary amine), the subsequent condensation polymerization will be favored to proceed only in two dimensions, allowing for the formation of an alcohol soluble polyamide with moderately high molecular weight and little or no crosslinking. Preferably, X is an alkylene group of from two to eight carbon atoms, and more preferably from two to four carbon atoms. Z and Z' are preferably an alkyl group of from one to four carbon atoms and preferably together form an alkylene group of from two to four carbon atoms. Particularly suitable for use in the present invention are the piperazines, including substituted piperazines such as 2-methylpiperazine, 2,5-dimethylpiperazine, etc., although other suitable bis(secondary amines) such as N,N'-dimethylethylenediamine, N,N'-diethylethylenediamine, and N,N'-dimethyl-1,3-propanediamine can also be employed.

The bis(secondary amine) is reacted preferably with about two mole-equivalents of an acrylic or methacrylic unsaturated ester in order to give the intermediate diester with no secondary amine groups capable of crosslinking in the subsequent condensation step. The unsaturated ester used in the preparation of the polyamide resin of the present invention is preferably of the formula:

wherein R is lower alkyl, such as methyl or ethyl, and $R_1$ is either hydrogen or methyl. Suitable acrylic esters for the invention include methyl acrylate, ethyl acrylate, methyl methacrylate, and ethyl methacrylate.

The reaction of the bis(secondary amine) and two mole-equivalents of the unsaturated ester occurs by means of a Michael addition. This reaction is strongly exothermic where the ester is acrylic, whereas external heating is required where the ester is methacrylic. The resulting diester is of the general formula:

$$\underset{\text{RO—C—CH—CH}_2\text{—N—X—N—CH}_2\text{—CH—C—OR}}{\overset{\overset{\text{O}}{\|}\quad\overset{R_1}{|}\quad\quad\overset{Z}{|}\quad\overset{Z'}{|}\quad\quad\overset{R_1}{|}\quad\overset{\text{O}}{\|}}{}} \quad (III)$$

wherein R, $R_1$, X, Z and Z' are as described above. In the preferred embodiment, the nitrogen atoms are linked with two —CH$_2$—CH$_2$— groups to form a piperazine ring. The IR spectrum (showing virtual absence of N—H and C≡C bonds) and the NMR spectra (proton and C13) have confirmed the existence of the above general structure.

In the second step of the resin preparation, the diester of formula (III) above is condensation polymerized with roughly an equimolar amount of a bis(primary amine) to form the polyamide. This polymerization proceeds preferably by distilling off the by-product alcohol (such as ethanol) produced in the reaction. The bis(primary amine) is employed in order to ensure that the condensation polymerization of the diester proceeds only in two dimensions to give the desired high molecular weight polyamide with low crosslinking. The amine groups should be primary, in order that the amide linkages of the resultant polyamides contain hydrogen-bondable $$\underset{-\text{N}-}{\overset{\overset{\text{H}}{|}}{}}$$

linkages, which in turn leads to superior film strength and adhesion. The bis(primary amine) will have the general formula:

$$H_2N-R_2-NH_2 \quad (IV)$$

wherein $R_2$ may be a carbocyclic group, an aralkyl group, or a linear or branched aliphatic group, and may contain heteroatoms (e.g., O, S, etc.). Preferably, the diamine used in the second reaction stage is 2-methylpentamethylenediamine or a blend thereof with other diamines in which 2-methylpentamethylenediamine is a major constituent. However, a number of other suitable bis(primary amines) can be employed either singly or in admixture, including hexamethylenediamine, ethylenediamine, trimethylhexamethylenediamine, 1,4-bis(3-aminopropyl)piperazine, diaminodioxaalkanes (such as 1,12-diamino-4,9-dioxadodecane and 1,8-diamino-3,6-dioxaoctane), diaminocyclohexane, polyoxypropylenediamines, and other diaminoalkanes (such as 1,12-diaminododecane).

In general, the polyamide resin produced by the condensation polymerization step will comprise repeating units of the general formula:

$$\underset{\text{+C—CH—CH}_2\text{—N—X—N—CH}_2\text{—CH—C—NH—R}_2\text{—NH+}}{\overset{\overset{\text{O}}{\|}\quad\overset{R_1}{|}\quad\quad\overset{Z}{|}\quad\overset{Z'}{|}\quad\quad\overset{R_1}{|}\quad\overset{\text{O}}{\|}}{}} \quad (V)$$

wherein $R_1$, $R_2$, X, Z, and Z' are as described above. The polyamide resins of formula V above preferably have a molecular weight per repeating unit of from about 250 to 450, and the number-average molecular weight of the resins is generally about 1500 to 6000, and preferably about 2000 to 5000. The resins are preferably soluble in alcohols, including n-propanol, ethanol, and others commonly used in the flexographic printing process. These resins additionally range from sparingly soluble to soluble in water, which therefore permits the use of water as a diluent in the inks of this invention. The polyamides are largely insoluble in other conventional polymer solvents such as aromatics, ketones, esters, and THF.

In order to prepare the polyamide resins of the present invention, it is preferred that the two-mole equivalent amount of the unsaturated ester be added dropwise to the bis(secondary amine) in the first stage of the preparation. Since this reaction is strongly exothermic where the unsaturated ester is acrylic in nature, the temperature of the reaction can be controlled by adjusting the rate of the addition. Typically, the first reaction step should be kept at a temperature of from about 60°–80° C. The initial slurry will gradually change to a clear liquid as the intermediate diester forms. If allowed to equilibrate at room temperature, the intermediate diester may become crystalline.

In the condensation polymerization step of the resin preparation, the bis(primary amine), such as 2-methylpentamethylenediamine, is reacted in approximately equimolar amounts with the diester in a nitrogen-sparged mixture heated under a distillation head. Generally, the batch temperature for this reaction should be from about 150°–200° C. While the mixture is heated, the by-product alcohol (such as ethanol) distillate is removed until its generation becomes very slow, indicating that the condensation reaction is approaching completion. The viscous product of the condensation is then cooled, and partial vacuum may be applied at this time to remove residual volatiles. At this point, is is preferred that the hot, stirrable mass is diluted slowly with propanol under a reflux condenser. When a 50% solids level is achieved, the vehicle slowly forms a reversible hydrogen-bonded "gel" on storage. If diluted further to a 30% or lower solids level, it remains liquid indefinitely. Upon removal of the solvent, the polyamide resin produced in accordance with the invention is a clear, tough, non-tacky solid.

The fluid ink compositions of the present invention particularly suitable for use as laminating inks can be prepared by combining the polyamide resin prepared as disclosed above in an alcohol solvent (such as propanol) with an appropriate pigment, such as titanium dioxide. Generally, the polyamide resin dissolved in alcohol solvent comprises from about 20 to 60% of the resin-alcohol solution by weight, and preferably about 30% by weight of the solution. The amount of pigment which should be added to the resin-alcohol solution will vary depending on the actual materials employed; but a preferred range will be such that the polyamide resin to pigment ratio by weight is from about 0.25:1 to about 1.5:1. As an example, a weight ratio of the polyamide resin to the pigment in the composition of the present invention of about 0.3:1 is suitable.

A preferred method of producing the fluid ink composition is to combine the pigment and an approximately equivalent amount (by weight) of the polyamide vehicle (at about a 30% solids level in alcohol solvent) in a suitable grinding apparatus, such as a shot mill, where the components can be dispersed until an acceptable fineness-of-grind is obtained. This ink can be filtered if so desired, and reduction with additional solvent (such as n-propanol) is performed up to the point where a desired viscosity is achieved. Inks prepared in this manner were tested on various substrates, such as polypropylene, polyester, and nylon, by hand printing the ink on the films. The ink of the invention showed the superior qualities of the resin as a laminating ink vehicle in that excellent results were observed in scotch tape adhesion tests, block testing, and tests of lamination bond strengths.

A fluid ink composition of the present invention which incorporates the present polyamide resin is not only superior in terms of its abilities to be used as a laminating ink, but is less expensive than a similar ink composition prepared using other conventional laminating ink resins.

The fluid ink compositions of the present invention will thus particularly be suitable as laminating inks and will have superior qualities with respect to tape adhesion, and lamination bond strength. However, in some cases, the present polyamide resins will also exhibit some water sensitivity. In laminating inks, in particular, high water resistance is desirable. Accordingly, in these and other instances when high water resistance is essential, the present resins may be combined with water resistant resins, particularly water resistant polyamides, to enhance adhesion.

The following examples are presented as illustrative only of the present invention and are not intended to limit its scope in any way:

EXAMPLE 1

Procedure for Preparing Polyamide Resins

One hundred grams of ethyl acrylate is added dropwise with agitation to 43.1 g piperazine, controlling the exotherm by the rate of addition. The initial slurry changes gradually to a clear liquid. A typical maximum temperature is approximately 80° C. If allowed to equilibrate at room temperature, this intermediate diester may crystallize to a low-melting solid.

Next 58.1 g 2-methylpentamethylenediamine is added, and the nitrogen-sparged mixture is heated under a distillation head. Over a batch temperature of approximately 150°–220° C., an ethanolic distillate is removed until its generation becomes very slow (typical recovery, 43 g). While the viscous product is cooling, partial vacuum may be applied to remove residual volatiles. Then the still hot and stirrable mass is diluted, slowly at first, with 155 g n-propanol under a reflux condenser. This 50% solids vehicle eventually forms a reversible, hydrogen-bonded "gel" on standing. If diluted further to 30% solids, it remains liquid indefinitely. On removal of solvent, the polyamide is a clear, tough, non-tacky solid with a surprisingly high level of solubility in water. The polyamide produced in the example has a number-average molecular weight of about 3400. Generally, if the starting materials are to be changed, the weight of the replacement material has to be a that the molar ratio remains the same. As an example, 58.1 g of hexamethylenediamine or 79.2 g of trimethylhexamethylenediamine would be used instead of the 58.1 g 2-methylpentamethylenediamine employed above.

EXAMPLE 2

Procedure for Preparinq Fluid Ink Compositions and Evaluation of the Compositions Forty grams of titanium dioxide and 41.6 g of the 30%-solids vehicle prepared in Example 1 are dispersed by shot mill until an acceptable fineness-of-grind is obtained. The ink is filtered and reduced with additional n-propanol until a Zahn-2 viscosity of 26 seconds at ambient temperature is obtained. A hand proofer is used to print this ink on three different packaging films: polypropylene, polyester, and nylon.

The tape pull test (Scotch 610 tape) shows no ink removal on all the films.

Block testing (5 psi, 80% R.H., 115° F., 16 hr) shows no face-to-back ink blocking on polypropylene.

Standard laboratory procedures are used to simulate commercial adhesive lamination (using a catalyzed urethane adhesive) and extrusion lamination, both to polyethylene. Bond strengths (in grams/linear inch) are estimated using a Suter tester:

| Lamination | Polypropylene | Polyester | Nylon |
| --- | --- | --- | --- |
| Extrusion | 650 | 800 | 750 |
| Adhesive | 150 | 1000 | 1000 |

These tests indicate the suitability of ink compositions prepared in accordance with the present invention as laminating inks.

EXAMPLE 3

To the piperazine-ethyl acrylate adduct prepared as in Example 1 was added a blend of 29.05 g each of 2-methylpentamethylenediamine and hexamethylenediamine. Polymerization and solution in n-propanol were carried out as in Example 1. Unlike the product of Example 1, this polyamide is practically insoluble in water and its 30% solution in n-propanol slowly forms a reversible gel on standing. A white ink made from this 30% vehicle as in Example 2, when proofed on the same films as in Example 2 plus PVDC-coated cellophane, shows the following results:

No tape removal, except on (untreated) nylon.

No face-to-back blocking, expect slightly on nylon.

| Bond strengths: | Polypropylene | Cellophane | Polyester | Nylon |
| --- | --- | --- | --- | --- |
| Extrusion | >200, tear | 650, tear | 450, tear | 650 |
| Adhesive | >200, tear | 480, tear | 450, tear | 50 |

EXAMPLE 4

There was no exotherm when 200 g methyl methacrylate was added to 86 g piperazine. Upon heating to 72° C. over 70 minutes, the stirred slurry homogenized to a light golden liquid. The adduct was further heated to 100° C. over 90 minutes to assure complete reaction. The infrared spectrum showed practically complete conversion of the reactive N—H and C=C groups. This intermediate was then polymerized with a stoichiometric amount of 2-methylpentamethylenediamine as in Example 1. Because methanol is the by-product in this case, the batch temperature range was lower, approximately 140–190° C. The resulting 50%-solids solution in n-propanol "gelled" gradually on standing. A white ink made from an indefinitely stable 30% solution gave less impressive bond strengths (150–650 g/in.) than in the earlier examples.

What is claimed is:

1. In a fluid ink composition comprising a resin, alcohol solvent, and a pigment, the improvement wherein the resin comprises an alcohol soluble polyamide resin having recurring units of the formula:

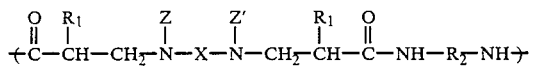

wherein $R_1$ is either hydrogen or methyl, $R_2$ is either a carbocyclic, aralkyl, or linear or branched aliphatic group, x is an alkylene group and Z and Z' each represent an alkyl group which may be the same or different or together form an alkylene group.

2. A composition according to claim 1 wherein the polyamide resin has a number-average molecular weight of from about 1500 to 6000.

3. A composition according to claim 1 wherein the polyamide resin is water soluble.

4. A composition according to claim 1 wherein the pigment comprises titanium dioxide.

5. A composition according to claim 1 wherein the alcohol solvent comprises propanol.

6. A composition according to claim 1 wherein the polyamide resin is present in an amount about 20% to about 60% polyamide resin by weight, based on the weight of resin and alcohol solvent.

7. A composition according to claim 6 wherein the polyamide resin comprises about 30% by weight of the resin and alcohol solvent.

8. A composition according to claim 1 wherein the ratio by weight of the polyamide resin to the pigment is from about 0.25:1 to 1.5:1.

9. A composition according to claim 8 wherein the ratio by weight of the polyamide resin to the pigment is about 0.3:1.

10. A composition according to claim 1 wherein Z and Z' together form an alkylene group.

* * * * *